(12) United States Patent
Takeda

(10) Patent No.: US 7,738,328 B2  
(45) Date of Patent: Jun. 15, 2010

(54) OPTICAL DISK APPARATUS FOR CARRYING OUT A DEFOCUS REGULATION

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 625 days.

(21) Appl. No.: 11/711,807

(22) Filed: Feb. 28, 2007

(65) Prior Publication Data

US 2007/0206458 A1 Sep. 6, 2007

(30) Foreign Application Priority Data

Mar. 3, 2006 (JP) .................... P2006-057353

(51) Int. Cl.
*G11B 7/00* (2006.01)
(52) U.S. Cl. .................. 369/44.26; 369/53.2; 369/53.28
(58) Field of Classification Search .................. None
See application file for complete search history.

(56) References Cited

U.S. PATENT DOCUMENTS

| | | | | |
|---|---|---|---|---|
| 6,115,333 | A * | 9/2000 | Igarashi | 369/44.27 |
| 2003/0063534 | A1* | 4/2003 | Takeda | 369/47.22 |
| 2004/0027947 | A1* | 2/2004 | Asano et al. | 369/47.31 |
| 2005/0078574 | A1* | 4/2005 | Wada et al. | 369/44.32 |
| 2005/0180276 | A1* | 8/2005 | Watanabe et al. | 369/44.29 |

FOREIGN PATENT DOCUMENTS

| | | |
|---|---|---|
| JP | 3-141036 A | 6/1991 |
| JP | 8-339550 | 12/1996 |
| JP | 2000-76668 | 3/2000 |
| JP | 2003-109232 | 4/2003 |

* cited by examiner

*Primary Examiner*—Paul Huber
(74) *Attorney, Agent, or Firm*—Morgan, Lewis & Bockius LLP

(57) ABSTRACT

An optical disk apparatus includes: a servo control unit, operable to execute a servo control of focusing based on a focus error signal and to execute a servo control of tracking based on a tracking error signal; a detrack regulating unit, operable to execute a detrack regulation for setting an offset voltage, which is to be added to the tracking error signal, to be a voltage for giving the highest signal quality of an output of an optical pickup; and a defocus regulating unit, operable to execute a defocus regulation for setting an offset voltage, which is to be added to the focus error signal, to be a voltage for giving the highest signal quality of the output of the optical pickup. The defocus regulation is executed in a state in which the servo control of the focusing and the servo control of the tracking are executed. The defocus regulation is executed after the detrack regulation is executed, in the state in which the servo control of the focusing and the servo control of the tracking are executed.

3 Claims, 4 Drawing Sheets

OPTICAL DISK APPARATUS FOR CARRYING OUT A DEFOCUS REGULATION

CROSS-REFERENCE TO RELATED APPLICATIONS

This application is based upon and claims the benefit of priority from prior Japanese patent application No. 2006-057353, filed on Mar. 3, 2006, the entire contents of which are incorporated herein by reference.

BACKGROUND OF THE INVENTION

The present invention relates to an optical disk apparatus, and more particularly to an optical disk apparatus for carrying out a defocus regulation in a state in which a servo control of focusing and tracking is performed.

In an apparatus for reproducing data recorded on an optical disk, the following technique has been proposed in order to enhance precision in a tracking servo and to improve the signal quality of a reproducing signal (which will be referred to as a first related art). More specifically, in the technique, focus-ON is carried out by executing a servo control of focusing and track-ON is carried out by executing a servo control of tracking as shown in FIG. 4 (a servo control of a CLV can also be carried out together in the technique). In this state, there is carried out a defocus regulation for adding an offset voltage to a focus error signal (which will be hereinafter referred to as an FE signal) in such a manner that a jitter amount of an RF signal is a minimum (an amplitude of the RF signal is a maximum).

Then, a tracking servo is turned OFF and a balance of a tracking error signal (which will be hereinafter referred to as a TE signal) (which will be hereinafter referred to as a TE balance) is regulated (a regulation for setting an offset of the TE signal to be zero) in such a manner that a peak voltage and a bottom voltage of the TE signal are symmetrical with a reference voltage when a beam spot crosses a track. More specifically, the TE balance is regulated in a state of a just focus in which a focal position of the beam spot is placed on a recording plane with high precision. For this reason, there is not generated a shift of the TE balance which is caused when the defocus regulation is carried out after the regulation of the TE balance. Therefore, a stable tracking servo is carried out (for example, see JP-A-2000-76668).

Moreover, the following technique has been proposed (which will be referred to as a second related art). More specifically, in the technique, a servo control of focusing is carried out to turn ON focusing in a reproduction of a CD, and subsequently, a defocus regulation for adding an offset voltage to a focus error signal (which will be hereinafter referred to as an FE signal) in such a manner that an amplitude of an RF signal is maximized. Then, a TE balance is regulated in such a manner that a peak voltage and a bottom voltage of a TE signal are symmetrical with a reference voltage when a beam spot crosses a track. Thereafter, a servo control of tracking is carried out. Accordingly, the servo control of the tracking is carried out in a state of the best TE balance. Consequently, a stable tracking servo is carried out (for example, see JP-A-8-339550).

In the case in which the first related art is used, however, the following problems arise. More specifically, in some cases in which an optical disk which is a reproducing target is a CD-R or a CD-RW in an apparatus for generating a TE signal by a DPD method, there is brought a state of detrack in which a beam spot is not positioned on a center of a track due to a shift of an attachment position of a PDIC that is a unit for detecting a reflected light or a variation in a sensitivity of a region of the PDIC divided into four parts also when the regulation of the TE balance is carried out.

When the defocus regulation is carried out in this state, the TE balance is lost due to the state of the detrack. In some cases in which the TE balance is lost, precision in the detection of the offset voltage to be added to the FE signal is deteriorated to cause a situation in which an offset voltage separated from an optimum value is added to the FE signal (a situation in which the defocus regulation cannot be carried out well).

Referring to the second related art, the defocus regulation is carried out in a state of track-OFF in which the servo control of the tracking is not performed. More specifically, in a state in which a signal indicative of data cannot be reproduced continuously, an offset voltage for giving a maximum amplitude of the RF signal is detected. For this reason, the precision in the detection of the offset voltage for giving the maximum amplitude of the RF signal is apt to be deteriorated. Therefore, there is a problem in that precision in the defocus regulation is deteriorated easily.

SUMMARY

It is therefore an object of the invention to provide an optical disk apparatus capable of preventing a deterioration in precision in a detection of an offset voltage to be added to an FE signal in a defocus regulation and preventing a reduction in precision in a detrack regulation.

In order to achieve the object, according to the invention, there is provided an optical disk apparatus comprising:

servo control means for executing a servo control of focusing based on a focus error signal and executing a servo control of tracking based on a tracking error signal;

detrack regulating means for executing a detrack regulation for setting an offset voltage, which is to be added to the tracking error signal, to be a voltage for giving a maximum amplitude of an RF signal generated by an output of an optical pickup; and defocus regulating means for executing a defocus regulation for setting an offset voltage, which is to be added to the focus error signal, to be a voltage for giving the maximum amplitude of the RF signal, wherein the defocus regulation is executed in a state in which the servo control of the focusing and the servo control of the tracking are executed, the tracking error signal is generated by a DPD method, the defocus regulation is executed after the detrack regulation is executed, in the state in which the servo control of the focusing and the servo control of the tracking are executed, a rotating speed of an optical disk in execution of the detrack regulation is a speed approximating to a rotating speed in reproduction of the optical disk, and the defocus regulation is executed after the detrack regulation is executed when the optical disk is a CD, and the defocus regulation is executed without executing the detrack regulation when the optical disk is a DVD.

DETAIL DESCRIPTION OF PREFERRED EMBODIMENTS

An embodiment of the invention will be described below with reference to the drawings.

Figure 1:
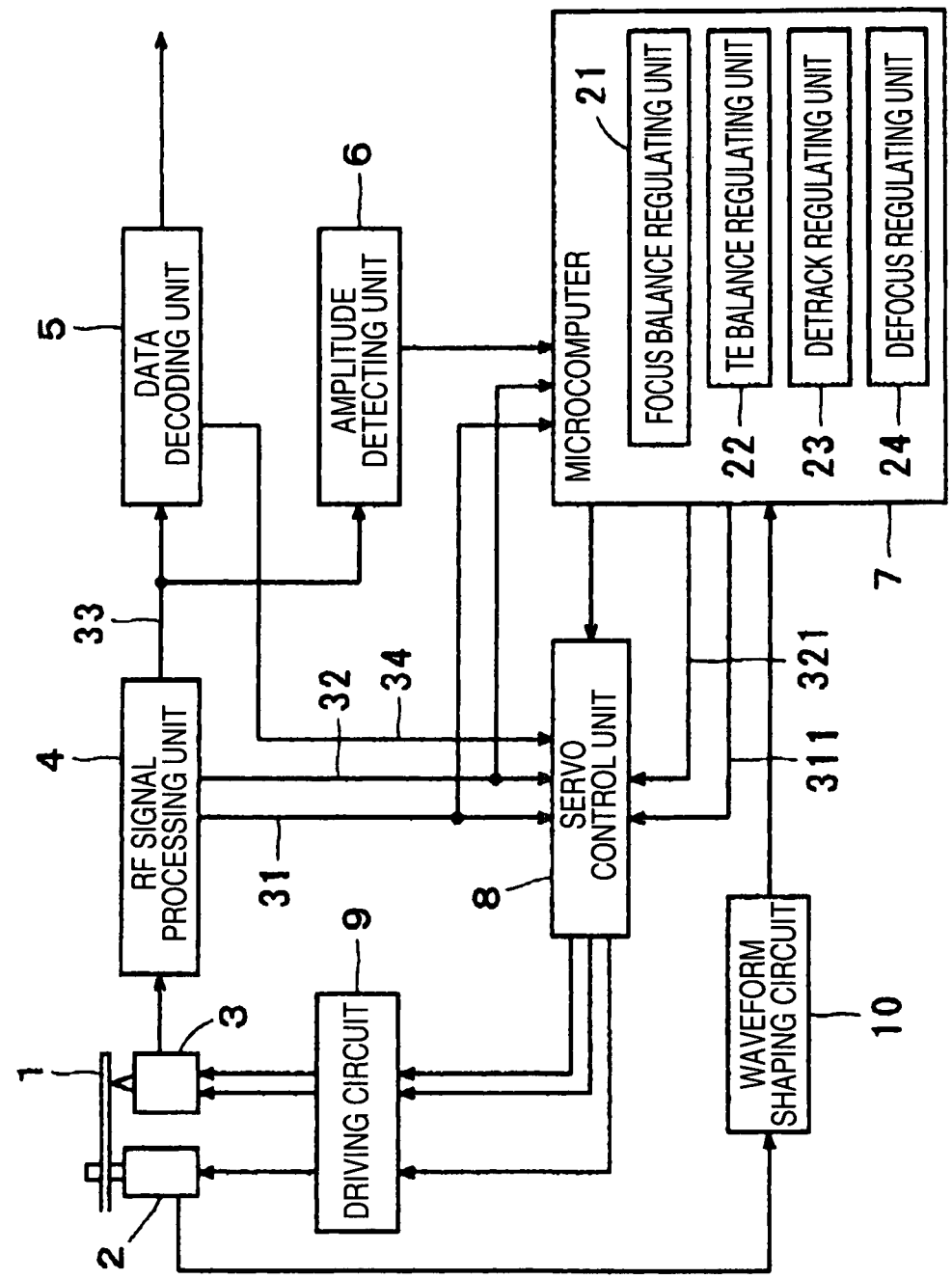
FIG. 1 is a block diagram showing an electrical structure of a front end of a DVD player according to an embodiment of an optical disk apparatus in accordance with the invention.

FIG. 1 is a block diagram showing an electrical structure of a front end of a DVD player according to an embodiment of an optical disk apparatus according to the invention.

In FIG. 1, an optical pickup 3 irradiates a laser beam having a wavelength corresponding to an optical disk 1 (a CD-ROM, a CD-R, a CD-RW, a DVD-ROM, a DVD-R, a DVD-RW or a DVD-RAM) to be rotated and driven by a spindle motor 2 onto the optical disk 1 and detects a light reflected from the optical disk 1.

An RF signal processing unit 4 generates a tracking error signal (which will be hereinafter referred to as a TE signal) 31 and a focus error signal (which will be hereinafter referred to as an FE signal) 32 from an output of the optical pickup 3, and outputs them to a servo control unit 8 and a microcomputer 7. Moreover, the RF signal processing unit 4 generates an RF signal 33 and outputs the RF signal 33 to a data decoding unit 5 and an amplitude detecting unit 6.

The data decoding unit 5 generates a reproducing clock 34 from the RF signal 33 and outputs the clock 34 thus generated to the servo control unit 8. Moreover, the data decoding unit 5 demodulates digital data by using the reproducing clock, and decodes the demodulated digital data and corrects an error, thereby reproducing data recorded on the optical disk 1. The reproduced data are output to a data processing unit which is not shown (a D/A conversion is carried out when the reproduced data are a linear PCM signal, and the D/A conversion is carried out after an execution of an expansion processing when the reproduced data are compressed video voice information).

The servo control unit 8 carries out a servo control over tracking of the optical pickup 3 through a driving circuit 9 based on the TE signal 31. Moreover, the servo control unit 8 carries out the servo control over focusing of the optical pickup 3 through the driving circuit 9 based on the FE signal 32. Furthermore, the servo control unit 8 carries out the servo control over a rotation of the spindle motor 2 through the driving circuit 9 based on the clock 34. The driving circuit 9 amplifies a signal output from the servo control unit 8 and outputs the amplified signal to a tracking actuator (not shown) or a focusing actuator (not shown) in the optical pickup 3. In addition, a signal indicative of a rotating speed of the spindle motor 2 is amplified to drive the spindle motor 2.

The amplitude detecting unit 6 detects a peak level and a bottom level of the RF signal 33 and calculates a difference between the peak level and the bottom level which are detected, and outputs a result of the calculation as a signal indicative of an amplitude of the RF signal 33 to the microcomputer 7. A waveform shaping circuit 10 shapes a waveform of an output of an FG generating portion (not shown) for outputting six pulses (another pulse number can be taken) every time the spindle motor 2 rotates, and sends the output to the microcomputer 7.

The microcomputer 7 controls a main control of a front end. More specifically, when the optical disk 1 is attached, a type of the attached optical disk 1 is distinguished. Moreover, the microcomputer 7 controls a start and stop of the servo control of the focusing and the tracking, and a start and stop of the rotation of the spindle motor 2. Furthermore, the microcomputer 7 regulates a TE balance, defocus and detrack. For this reason, the microcomputer 7 includes a focus balance regulating unit 21, a TE balance regulating unit 22, a detrack regulating unit 23 and a defocus regulating unit 24 as a part of the functions.

The focus balance regulating unit 21 detects an offset voltage required for setting a central voltage of the FE signal 32 to have a predetermined level (for example, 1.65V which is a half of 3.3V that is a source voltage) from a change in a level of the FE signal 32 which is obtained when the focusing actuator is driven. Then, the focus balance regulating unit 21 outputs an offset voltage 321 thus detected to the servo control unit 8 (The offset voltage 321 is added to the FE signal 32 in the servo control unit 8).

At this time, owing to the offset voltage 321, the servo control of the focusing can be carried out most stably. However, a characteristic of the optical pickup 3 has a variation. In some cases, therefore, the offset voltage 321 is not coincident with an offset voltage required for setting a focal position of a beam spot onto a recording plane of a track with high precision.

The TE balance regulating unit 22 detects an offset voltage required for setting a central voltage of the TE signal 31 to have a predetermined level (an offset voltage for setting a TE balance to be zero) based on a change in a level of the TE signal 31 when the beam spot crosses the track. Then, the TE balance regulating unit 22 outputs the detected offset voltage 311 to the servo control unit 8 (The offset voltage 311 is added to the TE signal 31 in the servo control unit 8).

At this time, owing to the offset voltage 311, the servo control of the tracking can be carried out most stably. However, the characteristic of the optical pickup 3 has a variation. In some cases, therefore, the offset voltage 311 is not coincident with an offset voltage required for positioning the beam spot onto the center of the track with high precision.

The detrack regulating unit 23 detects an offset voltage to maximize an amplitude based on a change in the amplitude of the RF signal 33 which is obtained when the offset voltage 311 to be added to the TE signal 31 is changed. Then, the detrack regulating unit 24 outputs the offset voltage 311 thus detected to the servo control unit 8 (The offset voltage 311 is added to the TE signal 31 in the servo control unit 8). At this time, the offset voltage 311 is such an offset voltage as to be required for positioning the beam spot onto the center of the track with high precision (such an offset voltage as to give the highest signal quality of the output of the optical pickup 3) in the servo control of the tracking.

Moreover, the detrack regulating unit 23 monitors an output of the waveform shaping circuit 10 when carrying out the detrack regulation, and thus waits for an increase in the rotating speed of the optical disk 1 until the rotating speed (a reproducing double speed) of the optical disk 1 approximates to a rotating speed in a reproduction. When the rotating speed of the optical disk 1 approximates to the rotating speed in the reproduction, then, an offset voltage to give the highest signal quality of the output of the optical pickup 3 is detected.

The reason is as follows. The level of the TE signal 31 generated by a DPD (Differential Phase Detection) method has such a property as to depend on the rotating speed of the optical disk 1. At a rotating speed separated from the rotating speed in the reproduction, accordingly, when the offset voltage for giving the highest signal quality of the output of the optical pickup 3 is detected, the detected offset voltage has a value with low precision.

The defocus regulating unit 24 detects an offset voltage for maximizing an amplitude based on a change in an amplitude of the RF signal 33 with a change in the offset voltage 321 to be added to the FE signal 32. Then, the defocus regulating unit 24 outputs the offset voltage 321 thus detected to the servo control unit 8 (The offset voltage 321 is added to the FE signal 32 in the servo control unit 8). At this time, the offset voltage 321 is such an offset voltage as to be required for setting the focal position of the beam spot onto the recording plane of the track with high precision (such an offset voltage as to give the highest signal quality of the output of the optical pickup 3) in the servo control of the focusing.

Figure 2:
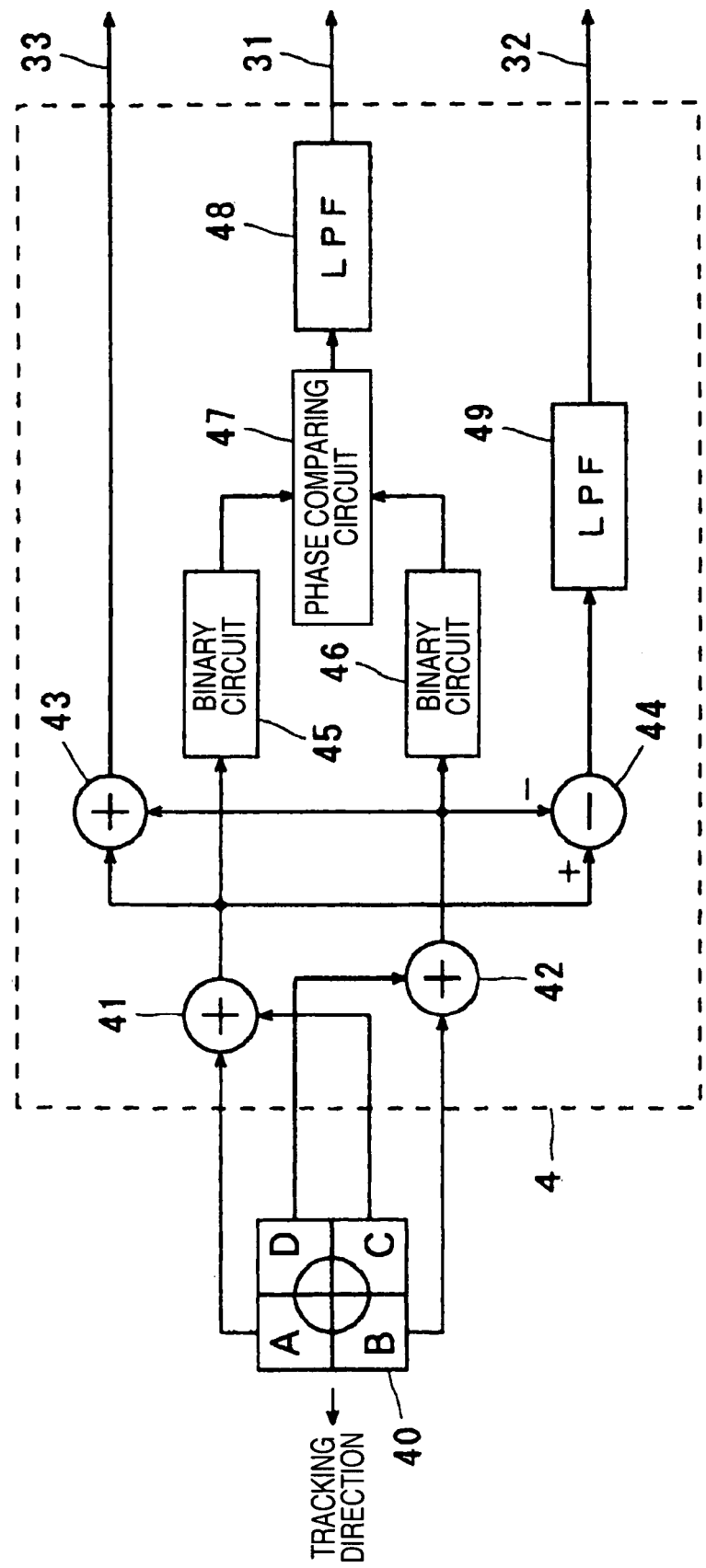
FIG. 2 is a block diagram showing a detailed electrical structure of an RF signal processing unit.

FIG. 2 is a block diagram showing a detailed electrical structure of the RF signal processing unit 4.

An adder 41 adds an output of an A region (which will be hereinafter referred to as A) and an output of a C region (which will be hereinafter referred to as C) in a light receiving unit 40 provided in the optical pickup 3. An adder 42 adds an output of a B region (which will be hereinafter referred to as B) and an output of a D region (which will be hereinafter referred to as D) in the light receiving unit 40.

An adder 43 adds an output (A+C) of the adder 41 and an output (B+D) of the adder 42, thereby generating the RF signal 33 (A+B+C+D). A subtracter 44 subtracts the output (B+D) of the adder 42 from the output (A+C) of the adder 41, thereby generating an FE signal ((A+C)−(B+D)). A low-pass filter 49 outputs the FE signal 32 obtained by removing an unnecessary high frequency component from the FE signal output from the subtracter 44.

A binary circuit 45 compares the output of the adder 41 with a predetermined level, thereby causing the output of the adder 41 to be binary. A binary circuit 46 compares the output of the adder 42 with the predetermined level, thereby causing the output of the adder 42 to be binary. A phase comparing circuit 47 compares a phase of an output of the binary circuit 45 with that of an output of the binary circuit 46, thereby generating a TE signal through a DPD method. A low-pass filter 48 outputs the TE signal 31 obtained by removing an unnecessary high frequency component from the TE signal output from the phase comparing circuit 47.

Figure 3:
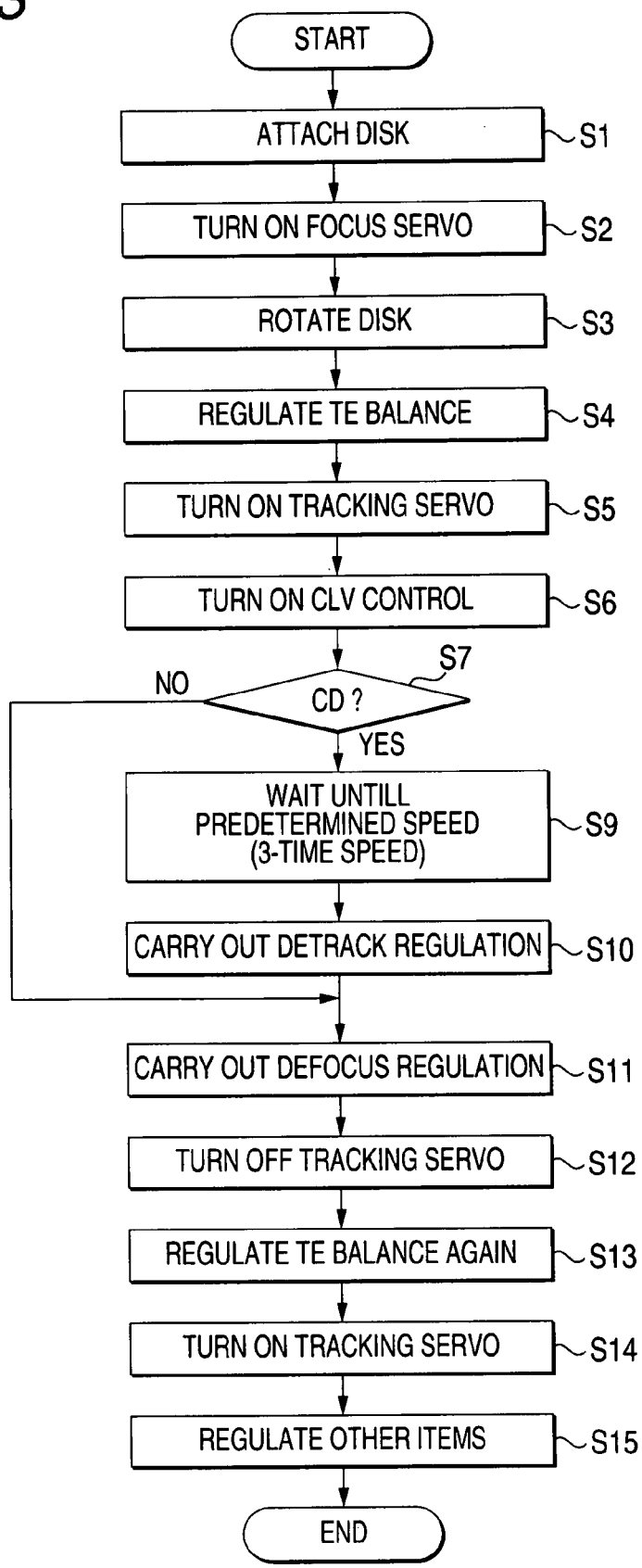
FIG. 3 is a flowchart showing a main operation according to an embodiment in an initialization when an optical disk is exchanged.
Figure 4:
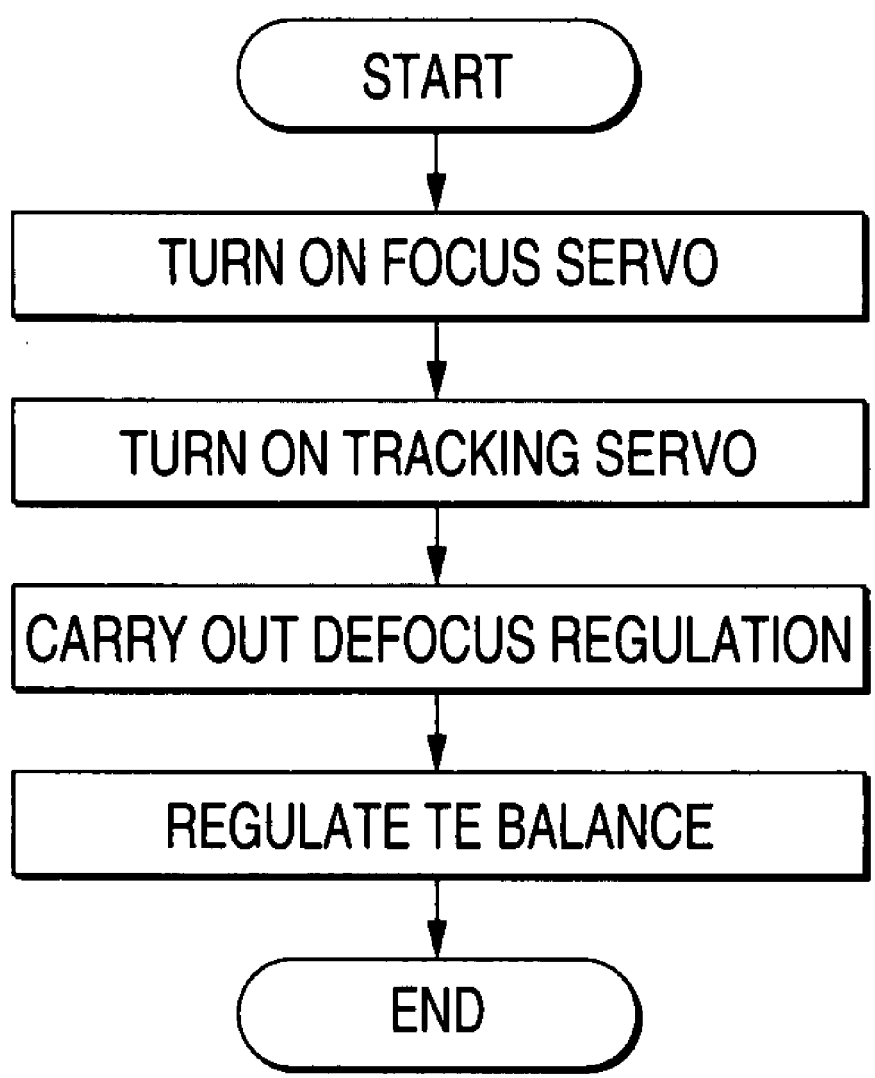
FIG. 4 is a flowchart showing a main operation according to the related art in an initialization when an optical disk is exchanged.

FIG. 3 is a flowchart showing a main operation according to the embodiment in an initialization when the optical disk 1 is exchanged. The operation according to the embodiment will be described with reference to FIG. 3 if necessary.

When the optical disk 1 is attached, the focus balance regulating unit 21 detects an offset voltage required for setting a central voltage of the FE signal 32 to have a predetermined level based on a change in the level of the FE signal 32 which is obtained when the focusing actuator is driven. Then, the offset voltage 321 thus detected is added to the FE signal 32 (The servo control of the focusing becomes the most stable). Thereafter, the servo control of the focusing to be carried out by the servo control unit 8 is started (Steps S1 and S2). Subsequently, a rotation of the optical disk 1 is started (Step S3).

The TE balance regulating unit 23 detects an offset voltage required for setting the central voltage of the TE signal 31 to have the predetermined level based on the level of the TE signal 31 which is obtained when the beam spot is controlled to cross the track in an OFF state of the servo control of the tracking, and carries out a TE balance regulation for adding the offset voltage 311 thus detected to the TE signal 31 (the servo control of the tracking becomes the most stable). Then, the servo control of the tracking to be carried out by the servo control unit 8 is started (Steps S4 and S5). Moreover, a CLV control to be carried out by the servo control unit 8 is also started (Step S6).

Subsequently, it is checked whether the optical disk 1 which is currently attached is a CD or a DVD (Step S7). If the attached optical disk 1 is the CD, the detrack regulating unit 23 monitors the output of the waveform shaping circuit 10 to wait until the rotating speed of the optical disk 1 is changed into a speed approximating to a four-time speed that is a speed in the reproduction (although a three-time speed is set in the embodiment, other speeds such as a 2.5-time speed and a 3.5-time speed) (Step S9).

When the optical disk 1 reaches the 3-time rotating speed, the detrack regulation is carried out. More specifically, the offset voltage to give a maximum amplitude is detected based on a change in the amplitude of the RF signal 33 when the offset voltage 311 to be added to the TE signal 31 is changed. The offset voltage 311 thus detected is added to the TE signal 31 (Step S10). For this reason, the control is carried out in such a manner that the beam spot is positioned on the center of the track with high precision (the signal quality of the output of the optical pickup 3 is the highest) in the servo control of the tracking.

When the detrack regulation is completed, a defocus regulation is carried out. More specifically, an offset voltage for giving a maximum amplitude is detected based on a change in an amplitude of the RF signal 33 obtained when changing the offset voltage 321 to be added to the FE signal 32. Then, the offset voltage 321 thus detected is added to the FE signal 32 (Step S11). In the servo control of the focusing, therefore, the control is carried out in such a manner that a focal position of the beam spot is set onto a recording plane of the track with high precision (the highest signal quality of the output of the optical pickup 3 can be obtained).

In the defocus regulation, such a control as to change the offset voltage to be added to the FE signal 32 is carried out. On the other hand, when the offset voltage to be added to the FE signal 32 is changed, there is generated such an influence that the beam spot is shifted from the central position of the track. When such a control as to change the offset voltage to be added to the FE signal 32 is carried out, however, the detrack regulation is performed in advance. Therefore, the servo control is carried out in such a manner that the beam spot is positioned on the center of the track with high precision. Also when the offset voltage to be added to the FE signal 32 is changed, therefore, an amount of a shift of the beam spot from the central position of the track is controlled within a range in which a disturbance is not generated over the tracking. In other words, also in the case in which the offset voltage to be added to the FE signal 32 is changed for the defocus regulation, the disturbance is not generated over the tracking. Therefore, the offset voltage for focusing which gives the highest reproducing quality can be detected with high precision.

When the defocus regulation is ended, the servo control of the tracking is set to be OFF in order to correct the shift of the TE balance generated by the defocus regulation, and a control is carried out in such a manner that the beam spot crosses the track (Step S12). In this case, an offset voltage for setting the TE balance to be zero is then detected based on a change in the level of the TE signal 31, and the offset voltage thus detected is added to the TE signal 31 (Step S13). Thereafter, the servo control of the tracking is restarted (Step S14). Subsequently, other items for an initialization are regulated (Step S15).

On the other hand, if it is decided that the attached optical disk 1 is the DVD in the decision at the Step S7, the detrack regulation is not carried out but the defocus regulation is executed. The reason is as follows. In case of the DVD, the servo control of the tracking is less influenced by the change in the offset voltage also when the offset voltage to be added to the FE signal 32 is changed, and the offset voltage for the focusing which gives a maximum level of the RF signal 33 can be detected with high precision also when the detrack regulation is not carried out but the defocus regulation is executed.

At this time, the detrack regulation is omitted. Therefore, a time required for the initialization is shortened corresponding to a time required for the detract regulation. In the case in which the optical disk 1 is the DVD, accordingly, a time required from the attachment of the optical disk 1 to the display of a reproduced image on a television receiver is shortened by a time required for the detrack regulation. In other words, it is possible to prevent the generation of a situation in which usability is deteriorated when the DVD is attached.

As described above, according to the embodiment, the TE balance is regulated again after the defocus regulation is carried out. When a reproducing operation is carried out, accordingly, the servo control of the tracking is executed with the best TE balance. In other words, in a reproduction, the most stable tracking is carried out. Also in the case in which the optical disk 1 has a scratch, therefore, it is possible to obtain an advantage that a shift is generated on the tracking with extreme difficulty.

The invention is not restricted to the embodiment but the description has been given to the case in which the invention is applied to a DVD player. However, the invention can also be applied to other apparatuses including reproducing functions of a CD-R and a CD-RW (for example, a DVD recorder and a hard disk drive integral DVD recorder).

Although the description has been given to the case in which the speed in the reproduction is set to be the 4-time speed, moreover, the invention can also be applied to the case of another speed (for example, a double speed or an 8-time speed).

While the description has been given to the structure in which it is decided whether the signal quality of the output of the optical pickup is the highest based on the amplitude of the RF signal, moreover, it is also possible to employ a structure in which it is decided whether the signal quality of the output of the optical pickup is the highest based on an amount of a jitter.

According to an aspect of the invention, the detrack regulation is carried out so that the defocus regulation is performed in the state in which it is possible to carry out the servo control for positioning the beam spot on the center of the track with high precision. For the defocus regulation, accordingly, an amount of a shift of the beam spot from the center of the track is suppressed to be set within a range in which a disturbance is not generated over the tracking also when the offset voltage to be added to an FE signal is to be changed. In other words, in the state in which the disturbance is not generated over the tracking, it is possible to detect an offset voltage for focusing which gives the highest reproducing quality. Moreover, the rotating speed of the optical disk to carry out the detrack regulation is set to be the speed approximating to the rotating speed in the reproduction of the optical disk. For this reason, it is possible to carry out the detrack regulation from which the influence generated by the dependency of a level of the tracking error signal on the rotating speed of the optical disk is removed. In the case in which the attached optical disk is a DVD, moreover, the detrack regulation is omitted. Therefore, a time required for an initialization is shortened by a time required for the detrack regulation. Consequently, it is possible to prevent a deterioration in the precision in the detection of the offset voltage to be added to the FE signal in the defocus regulation and to prevent a deterioration in the precision in the detrack regulation also when generating the tracking error signal by the DPD method, and to shorten a time required from the attachment of the DVD to a display of a reproduced image on a television receiver.

What is claimed is:

1. An optical disk apparatus comprising:
   a servo controller, operable to execute a servo control of focusing based on a focus error signal and to execute a servo control of tracking based on a tracking error signal;
   a detrack regulator, operable to execute a detrack regulation for setting an offset voltage, which is to be added to the tracking error signal, to be a voltage for giving the highest signal quality of an output of an optical pickup; and
   a defocus regulator, operable to execute a defocus regulation for setting an offset voltage, which is to be added to the focus error signal, to be a voltage for giving the highest signal quality of the output of the optical pickup, wherein
   the defocus regulation is executed in a state in which the servo control of the focusing and the servo control of the tracking are executed,
   the defocus regulation is executed after the detrack regulation is executed, in the state in which the servo control of the focusing and the servo control of the tracking are executed, and
   the defocus regulation is executed after the detrack regulation is executed when the optical disk is a CD, and the defocus regulation is executed without executing the detrack regulation when the optical disk is a DVD.

2. An optical disk apparatus comprising:
   servo control means for executing a servo control of focusing based on a focus error signal and executing a servo control of tracking based on a tracking error signal;
   detrack regulating means for executing a detrack regulation for setting an offset voltage, which is to be added to the tracking error signal, to be a voltage for giving a maximum amplitude of an RF signal generated by an output of an optical pickup; and
   defocus regulating means for executing a defocus regulation for setting an offset voltage, which is to be added to the focus error signal, to be a voltage for giving the maximum amplitude of the RF signal, wherein
   the defocus regulation is executed in a state in which the servo control of the focusing and the servo control of the tracking are executed,
   the tracking error signal is generated by a DPD method,
   the defocus regulation is executed after the detrack regulation is executed, in the state in which the servo control of the focusing and the servo control of the tracking are executed,
   a rotating speed of an optical disk in execution of the detrack regulation is a speed approximating to a rotating speed in reproduction of the optical disk, and
   the defocus regulation is executed after the detrack regulation is executed when the optical disk is a CD, and the defocus regulation is executed without executing the detrack regulation when the optical disk is a DVD.

3. An optical disk apparatus, comprising:
   an optical pickup, operable to read out data recorded on an optical disk;
   a focusing actuator, operable to perform a focusing operation of the optical pickup;
   a data reproducer, operable to: i) generate an RF signal by performing signal processing with respect to the data; ii) generate a focus error signal from an output signal from the optical pickup; and iii) generate a tracking error signal by a DPD method;

a servo controller, operable to: i) perform a focus servo control of the optical pickup in accordance with the focus error signal; and ii) perform a tracking servo control of the optical pickup in accordance with the racking error signal;

an amplitude detector, operable to: i) detect a difference between a peak level and a bottom level of the RF signal; and ii) generate an amplitude signal indicative of an amplitude of the RF signal based on the difference;

a focus balance regulator, configured to perform a focus balance regulation in which a focus offset voltage to be added to the focus error signal for causing a central voltage of the RF signal to be a prescribed level is detected in accordance with a level change of the RF signal which is generated when the focusing actuator is driven under a condition that the optical disk is initially installed in the optical disk apparatus;

a tracking balance regulator, configured to perform a tracking balance regulation in which a tracking offset voltage to be added to the tracking error signal for causing a central voltage of the RF signal to be a prescribed level is detected in accordance with a level change of the RF signal which is generated when a beam spot of the optical pickup traverses a track of the optical disk under a condition that the optical disk is rotated and the tracking servo control is not performed;

a disk type detector, configured to detect which one of a CD and a DVD is the optical disk under a condition that the tracking balance regulation is finished and the tracking servo control is performed;

a rotation speed controller, configured to rotate the optical disk at a prescribed speed higher than a speed of when the optical disk is subjected to data reproduction in a case where the disk type detector detects that the optical disk is a CD;

a detrack regulator, configured to perform a detrack regulation by adding a detrack offset voltage to the tracking error signal; and a defocus regulator, configured to perform a defocus regulation by adding a defocus offset voltage to the focus error signal, wherein:

the detrack offset voltage is a value of the tracking offset voltage which causes the amplitude of the RF signal to be maximum and is identified by monitoring the amplitude signal to detect change of the amplitude of the RF signal, which is generated when the tracking offset voltage is changed under a condition that a rotation speed of the optical disk reaches the prescribed speed; and the defocus offset voltage is a value of the focus offset voltage which causes the amplitude of the RF signal to be maximum and is identified by monitoring the amplitude signal to detect a change of the amplitude of the RF signal, which is generated under a condition that either i) the detrack regulation is finished; or ii) the disk type detector detects that the optical disk is a DVD.

* * * * *